United States Patent Office 3,652,457
Patented Mar. 28, 1972

3,652,457
HYDROTHERMAL METHOD OF MANUFACTURING A HYDROCARBON CONVERSION CATALYST CONTAINING AT LEAST ONE HYDROGENATING COMPONENT, AND THE CATALYST SO MANUFACTURED
Joseph Jaffe, Berkeley, Calif., assignor to Chevron Research Company, San Francisco, Calif.
No Drawing. Filed Sept. 30, 1968, Ser. No. 763,922
Int. Cl. B01j 11/78, 11/40
U.S. Cl. 252—442                                    13 Claims

ABSTRACT OF THE DISCLOSURE

Hydrothermal conversion method for manufacturing a hydrocarbon conversion catalyst comprising at least one hydrogenating component in intimate admixture with a layered synthetic crystalline clay-type aluminosilicate component, said intimate admixture being a result of forming said aluminosilicate component in the presence of a precursor of said hydrogenating component, from precursors of said aluminosilicate component, under conditions of elevated temperature and pressure, and catalyst so manufactured.

INTRODUCTION

This application relates to hydrocarbon conversion catalysts comprising at least one hydrogenating component and a layered synthetic crystalline clay-type aluminosilicate component, and particularly to a method for manufacturing said catalyst and to the catalysts manufactured by said method.

PRIOR ART

It is known, particularly from Granquist U.S. Pat. 3,252,757, that a relatively new layered crystalline aluminosilicate clay-type mineral that has been synthesized has the empirical formula

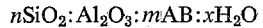
$$nSiO_2 : Al_2O_3 : mAB : xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations. The equivalent of an exchangeable cation, A, in said mineral may be chosen from the group consisting of $H^+$, $NH_4^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

Said layered synthetic crystalline aluminosilicate mineral (hereinafter included in the term, used for brevity, "layered aluminosilicate," which term also is intended to include any other catalytically active layered crystalline aluminosilicate, whether synthetic or natural) is known to have application as a component of a catalytic cracking catalyst, and applications of said layered aluminosilicate as a component of a hydrocracking catalyst have been disclosed in the copending application of Sigmund M. Csicsery, Thomas R. Hughes and Joseph Jaffe, for "Hydrotreating Catalyst and Process," Ser. No. 760,619, filed September 18, 1968, and in the copending application of Joseph Jaffe for "Hydrotreating Catalyst and Process," Ser. No. 750,283, filed Aug. 5, 1968. Heretofore it has not been known, except in said copending applications, that said layered aluminosilicate had application as a component of a hydrocracking catalyst or other hydrotreating catalyst containing at least one hydrogenating component. Further, even in said copending applications it appears that the hydrogenating component or components are added to the layered aluminosilicate after the latter is formed.

OBJECTS

In view of the foregoing, it is an object of the present invention to provide an improved and simplified method for manufacturing catalysts comprising a layered crystalline clay-type aluminosilicate component and at least one hydrogenating component, whereby intimate admixture of said aluminosilicate component and said hydrogenating component is obtained, and to provide catalysts so manufactured.

STATEMENT OF INVENTION

In accordance with the present invention, a hydrogel or hydrogel slurry, preferably having a solids content of 1 to 40 weight percent, containing at least one precursor compound of at least one catalytic hydrogenating component, and containing precursor compounds of a layered synthetic crystalline clay-type aluminosilicate component is subjected to conditions of elevated temperature and pressure until the desired quantity of layered synthetic crystalline clay-type aluminosilicate forms, and the resulting hydrogel or hydrogel slurry comprising said clay-type aluminosilicate is dried and calcined, to produce a solid catalyst comprising said clay-type aluminosilicate and at least one catalytic hydrogenating component in intimate admixture therewith.

Preferably the hydrogel or hydrogel slurry is washed with dilute ammonium acetate and water before being subjected to the elevated temperature and pressure treatment of the process of the present invention.

The hydrogel or hydrogel slurry may be prepared in any convenient manner, using suitable precursor compounds of the final components of the desired catalyst. A suitable general procedure for forming the hydrogel or hydrogel slurry may be found in Joseph Jaffe U.S. Pat. 3,280,040. Hydrogenating component precursors and aluminum-containing precursor compounds preferably are chlorides. Suitable silicon-containing precursor compounds are alkali metal silicates.

Said catalytic hydrogenating component precursor compound is selected from compounds of nickel, cobalt, platinum, palladium and rhenium. In addition to said precursor compound, said hydrogel or hydrogel slurry advantageously may contain at least one catalytic hydrogenating component precursor compound selected from compounds of tungsten, molybdenum, tin and zinc.

Any one or more of the elements contained in the aforementioned catalytic hydrogenating component precursors may be present in the final catalyst, in the form of metals, oxides, sulfides or any combination thereof, in amounts selected from the following list, based on the total catalyst, calculated as metals:

| Elements: | Weight percent |
|---|---|
| Ni or Co | 1–20 |
| Pt or Pd | 0.01–2.0 |
| Re | 0.01–2.0 |
| W or Mo | 5–35 |
| Sn or Zn | 0.1–10 |

It has been found that the presence of tin, in the metal, oxide or sulfide form, particularly in combination with nickel, in the catalyst of the present invention, results in higher hydrocracking activity and higher hydrogenation activity than would be exhibited by a catalyst that is identical except that contains no tin. Further, the presence of tin permits the hydrogenation activity to be controlled in an essentially reversible manner by varying the amount of sulfur present in the feed.

Particularly effective hydrogenating components and combinations of catalytic hydrogenating components in the final catalyst, in the form of metals, oxides or sulfides, are:

| | |
|---|---|
| Ni or Co | NiSn |
| Pt or Pd | MoZn |
| Re | PtRe |
| NiMo or CoMo | PdRe |
| NiW or CoW | |

Said hydrogel or hydrogel slurry additionally may contain precursor compounds of an oxide selected from titania, zirconia, hafnia, thoria and ceria; any one or more of these oxides may be present in the final catalyst in an amount of 0 to 30 weight percent.

Said hydrogel or hydrogel slurry additionally may contain fluorine or a compound of fluorine, in an amount which will provide fluorine or a compound of fluorine in the final catalyst in an amount of 0–3 weight percent, calculated as F.

Because the suitable hydrothermal conversion temperatures for forming said clay-type aluminosilicate component from precursors thereof lie far above the normal boiling point of water, the hydrogel or hydrogel slurry conveniently is subjected to said conditions at elevated temperatures and pressure in a pressure vessel, so that the water contained therein will remain in the liquid state by autoclave action. The hydrogel or hydrogel slurry is maintained at the selected temperature and pressure for a sufficient period of time for the formation of said clay-type aluminosilicate to the desired extent. Preferred temperatures are 530° to 700° F., at pressures above 500 p.s.i.g., preferably above 900 p.s.i.g. The temperatures at which the formation of the clay-type aluminosilicate takes place is in the practical range 530° to 700° F., with about 545° F. being optimum. The optimum temperature does not vary greatly with the presence in the hydrogel or hydrogel slurry of the hydrogenating component precursor, or precursors of such final optional catalyst components as titania and zirconia. The pressure need not be appreciably in excess of the autoclave pressure of the hydrogel or hydrogel slurry, i.e., that developed by the vapor pressure of the water itself. The latter is only negligibly changed by the dissolved material in the hydrogel or hydrogel slurry, because the bulk of the solids therein is not in a form which appreciably changes the vapor pressure. Therefore, the ordinary tabulations of steam pressure may be used. Accordingly, at 545° F. the pressure developed is around 1000 p.s.i.g.

The reaction time may vary from 1 to 100 hours, depending upon the reaction temperature, pressure and degree of conversion of the hydrogel or hydrogel slurry to said clay-type aluminosilicate that is desired. With lower reaction temperatures longer reaction times are required for a given degree of conversion, and vice versa.

When the hydrogel or hydrogel slurry has remained at the selected conditions of temperature and pressure for a sufficient time for the desired amount of said clay-type aluminosilicate to form, the mixture is allowed to cool, and the hydrogel or hydrogel slurry containing said clay-type aluminosilicate is dried, for example at 200°–450° F., then activated in an oxygen-containing gas stream, which may be air, at a temperature of 900° to 1150° F. for 0.5 to 20 hours, to produce the final solid catalyst. It has been found that optimum activity is developed in the catalyst if the activation temperature does not exceed 1150° F.

The solid catalyst produced as described above may be used as such, in such reactions as hydrofining and hydrocracking. Those skilled in the art will recognize which catalytic components the catalyst should contain for the particular reaction for which the catalyst will be used, and will be aware of the operating conditions at which the reaction should be conducted.

As an alternative to using the solid catalyst produced as described above, as such, said catalyst may be broken into particles, for example pulverized into a powder, and said particles may be dispersed in a hydrogel or hydrogel slurry comprising components selected from precursor compounds of alumina, silica, silica-alumina, silica-alumina-titania, and silica-alumina-zirconia, and the resulting mixture may be dried and activated, at the same conditions used for drying and activating the material of said particles, to form a catalyst composite. The hydrogel or hydrogel slurry in which said particles are dispersed may contain any or all of the components of the hydrogel or hydrogel slurry used in making said particles, or may contain any components that the foregoing discussion indicates could have been contained in the hydrogel or hydrogel slurry used in making said particles. Additionally, the hydrogel or hydrogel slurry in which said particles are dispersed may contain particles of crystalline zeolitic molecular sieve, preferably X or Y type. Said molecular sieve desirably may be an ultra-stable molecular sieve, that is, one having a sodium content below 3 weight percent, calculated as $Na_2O$, a unit cell size below about 24.65 angstroms, and a silica/alumina ratio above about 2.15.

Examples

The following examples will aid in understanding the catalyst preparation method of the present invention, and use of the catalyst prepared thereby.

Example 1.—A crystallized metal-clay catalyst composite was prepared from an amorphous cogelled catalyst precursor of the following composition:

| Component: | Wt. percent of total catalyst, anhydrous basis |
|---|---|
| NiO | 12.0 |
| $SnO_2$ | 5.6 |
| $Al_2O_3$ | 28.3 |
| $SiO_2$ | 54.1 |

The catalyst was prepared by the following steps, using sufficient quantities of the various starting materials to produce the above-indicated weight percentages of the components of the final catalyst:

(1) An aqueous acidic solution was prepared, containing $AlCl_3$, $NiCl_2$, $SnCl_2$ and acetic acid.

(2) Two alkaline solutions were prepared: (a) a sodium silicate solution; (b) an ammonia solution containing sufficient excess ammonia so that upon combining the alkaline solutions with the acidic solution coprecipitation of all of the above-listed oxides would occur at a neutral pH of about 7.

(3) The acidic and alkaline solutions were combined, and coprecipitation of all the above-listed oxides occurred at a pH of about 7, resulting in a slurry.

(4) The slurry was filtered to produce a hydrogel filter cake. The filter cake was partially dried to about 30% solids content and extruded into small pellets. The pellets were washed repeatedly with dilute ammonium acetate solution to remove sodium and chloride ionic impurities.

(5) The washed hydrogel pellets were loaded into an autoclave with some excess water, and were aged for 24 hours at 1000 p.s.i.g. autogenous pressure (545° F.).

(6) The autoclaved pellets were dried at 250° F., then activated for 5 hours at 950° F. in flowing dry air. X-ray diffraction examination showed the pattern of a layered crystalline clay-type aluminosilicate.

Example 2.—The catalyst of Example 1 was used to hydrocrack a hydrofined California light cycle oil of the following description:

| | |
|---|---|
| Gravity, ° API | 30 |
| Aniline point, ° F. | 131 |
| Organic nitrogen, p.p.m. | 0.5 |
| Boiling range, ° F. | 400–700 |

The hydrocracking conditions were as follows:

| | |
|---|---|
| Liquid hourly space velocity, v./v./hr. | 1.5 |
| Per-pass conversion to products boiling below 400° F., vol. percent | 60 |
| Exit gas rate, s.c.f./bbl. | 5600 |
| Total pressure, p.s.i.g. | 1200 |

The starting temperature necessary to achieve the indicated per-pass conversion was 608° F. The catalyst fouling rate was 0.12° F. per hour.

Example 3.—A catalyst is prepared exactly as in Example 1, except that following step 3 in that example, sufficient ammonium bifluoride is added to the slurry to provide 0.1 to 3 weight percent fluoride in the final catalyst. Instead of ammonium bifluoride, ammonium fluoride, sodium fluoride or HF may be used when the final catalyst is to contain fluoride.

Although only specific embodiments of the present invention have been described and exemplified, numerous variations can be made in those embodiments without departing from the spirit of the invention, and all such variations that fall within the scope of the appended claims are intended to be embraced thereby.

What is claimed is:

1. The method of manufacturing a hydrocarbon conversion catalyst which comprises forming a hydrogel or hydrogel slurry containing a compound of silica and a compound of alumina and containing at least one precursor compound of at least one catalytic hydrogenating component, said hydrogel or hydrogel slurry having a solids content of 1 to 40 weight percent, subjecting said hydrogel or hydrogel slurry to a temperature in the range 530° to 700° F. in an autoclave at a pressure above 500 p.s.i.g. until at least a portion of said hydrogel or hydrogel slurry has been converted to a layered synthetic crystalline clay-type aluminosilicate, and drying and activating the resulting hydrogel or hydrogel slurry comprising said clay-type aluminosilicate to produce a solid catalyst comprising said clay-type aluminosilicate and at least one catalytic hydrogenating component in intimate admixture therewith.

2. The method as in claim 1, wherein said precursor compound is selected from compounds of nickel, cobalt, platinum, palladium and rhenium.

3. The method as in claim 1, wherein said hydrogel or hydrogel slurry contains at least one precursor compound of an oxide selected from titanium, zirconium, hafnium, thorium and cerium oxides.

4. The method as in claim 1, wherein said drying and calcining are accomplished at temperatures not exceeding 1150° F.

5. The method as in claim 1, wherein said hydrogel or hydrogel slurry is subjected to said temperature and said pressure for a period of 1 to 100 hours.

6. The method as in claim 1, wherein said hydrogel or hydrogel slurry contains fluorine or a compound of fluorine.

7. The method as in claim 1, with the additional steps of breaking said solid catalyst into particles and dispersing said particles in a hydrogel or hydrogel slurry comprising components selected from precursor compounds of alumina, silica, silica-alumina, silica-alumina-titania, and silica-alumina-zirconia, and drying and calcining the resulting mixture to form a catalyst composite.

8. The method as in claim 2, wherein in addition to said precursor compound said hydrogel or hydrogel slurry contains at least one catalytic hydrogenating component precursor compound selected from compound of tungsten, molybdenum, tin and zinc.

9. A hydrocarbon conversion catalyst comprising at least one hydrogenating component and a synthetic layered clay-type aluminosilicate component, said components being in intimate admixture as a result of formation of said aluminosilicate component in the presence of a precursor of said hydrogenating component, from precursors of said aluminosilicate component, under conditions of elevated temperature and pressure.

10. A hydrocarbon conversion catalyst as in claim 9, wherein said hydrogenating component is selected from nickel, cobalt, platinum, palladium and rhenium and compounds thereof.

11. A hydrocarbon conversion catalyst as in claim 10, further comprising a component selected from tungsten, molybdenum, tin and zinc and compounds thereof.

12. A hydrocarbon conversion catalyst as in claim 9, further comprising fluorine or a compound thereof.

13. A hydrocarbon conversion catalyst comprising particles of the catalyst of claim 9 and a gel matrix comprising catalyst components, said particles being dispersed through said gel matrix.

References Cited
UNITED STATES PATENTS

| | | | |
|---|---|---|---|
| 3,244,643 | 4/1966 | Schwartz | 252—455 |
| 3,422,033 | 1/1969 | Ballard, Jr., et al. | 252—455 |
| 3,373,109 | 3/1968 | Frilette et al. | 252—455 |

DANIEL E. WYMAN, Primary Examiner

C. F. DEES, Assistant Examiner

U.S. Cl. X.R.

252—451, 455 R